United States Patent
Cui et al.

(10) Patent No.: US 11,949,879 B2
(45) Date of Patent: Apr. 2, 2024

(54) VIDEO CODING METHOD AND APPARATUS, COMPUTER DEVICE, AND STORAGE MEDIUM

(71) Applicant: Tencent Technology (Shenzhen) Company Limited, Shenzhen (CN)

(72) Inventors: Jing Cui, Shenzhen (CN); Tao Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 300 days.

(21) Appl. No.: 17/512,486

(22) Filed: Oct. 27, 2021

(65) Prior Publication Data
US 2022/0053198 A1 Feb. 17, 2022

Related U.S. Application Data

(63) Continuation of application No. PCT/CN2020/113153, filed on Sep. 3, 2020.

(30) Foreign Application Priority Data

Oct. 22, 2019 (CN) .......................... 201911005290.8

(51) Int. Cl.
*H04N 19/14* (2014.01)
*H04N 19/105* (2014.01)
(Continued)

(52) U.S. Cl.
CPC ........... *H04N 19/14* (2014.11); *H04N 19/105* (2014.11); *H04N 19/119* (2014.11); *H04N 19/182* (2014.11)

(58) Field of Classification Search
CPC .... H04N 19/105; H04N 19/119; H04N 19/14; H04N 19/176; H04N 19/182;
(Continued)

(56) References Cited

U.S. PATENT DOCUMENTS

| 2002/0067432 A1* | 6/2002 | Kondo | ................... G01R 23/09 |
| | | | 348/576 |
| 2004/0181403 A1* | 9/2004 | Hsu | ....................... G10L 19/025 |
| | | | 704/E19.012 |

(Continued)

FOREIGN PATENT DOCUMENTS

| CN | 104363450 A | 2/2015 |
| CN | 105721865 A | 6/2016 |

(Continued)

OTHER PUBLICATIONS

Caixia Bai, et al., "Fast Coding Tree Unit Decision for HEVC Intra Coding", ICCE-China Workshop, Apr. 30, 2013, 3 pgs., Retrieved from the Internet: https://ieeexplore.jeee.org/abstract/document/6780861.

(Continued)

*Primary Examiner* — Peter D Le
(74) *Attorney, Agent, or Firm* — Morgan, Lewis & Bockius LLP

(57) ABSTRACT

This application relates to a video coding method and apparatus, a computer device, and a storage medium. The method includes: obtaining a current coding unit; obtaining target pixel gradient data through calculation according to a pixel value of a pixel in the current coding unit, the target pixel gradient data being obtained according to a difference between the pixel value of the pixel and a reference pixel value; determining a target division decision result corresponding to the current coding unit according to the target pixel gradient data; and performing video coding on the current coding unit according to the target division decision result.

20 Claims, 8 Drawing Sheets

(51) Int. Cl.
*H04N 19/119* (2014.01)
*H04N 19/182* (2014.01)

(58) Field of Classification Search
CPC .......... H04N 19/70; H04N 19/96; H04N 1/00;
H04N 19/00; H04N 3/00; H04N 5/00;
H04N 7/00; H04N 9/00; H04N 11/00;
H04N 13/00; H04N 17/00; H04N 21/00;
H04N 23/00; H04N 25/00; H04N
2101/00; H04N 2201/00; H04N 2209/00;
H04N 2213/00
See application file for complete search history.

(56) References Cited

U.S. PATENT DOCUMENTS

| | | | | |
|---|---|---|---|---|
| 2011/0274177 | A1* | 11/2011 | Park | H04N 19/91 |
| | | | | 375/E7.076 |
| 2015/0016523 | A1* | 1/2015 | Puri | H04N 19/59 |
| | | | | 375/240.12 |
| 2015/0288973 | A1* | 10/2015 | Lee | H04N 13/128 |
| | | | | 375/240.02 |
| 2015/0365703 | A1* | 12/2015 | Puri | H04N 19/46 |
| | | | | 375/240.24 |
| 2016/0044327 | A1* | 2/2016 | Kim | H04N 19/17 |
| | | | | 382/233 |
| 2016/0050419 | A1* | 2/2016 | Zhao | H04N 19/1887 |
| | | | | 375/240.12 |
| 2016/0057429 | A1* | 2/2016 | Yin | H04N 19/567 |
| | | | | 375/240.16 |
| 2016/0323585 | A1* | 11/2016 | Zhai | H04N 19/119 |
| 2016/0330479 | A1* | 11/2016 | Liu | H04N 19/176 |
| 2018/0324426 | A1* | 11/2018 | Huang | H04N 19/176 |
| 2019/0052909 | A1* | 2/2019 | Choi | H04N 19/18 |
| 2019/0253709 | A1* | 8/2019 | Mao | H04N 19/14 |
| 2020/0162729 | A1* | 5/2020 | Lee | H04N 19/18 |
| 2020/0314446 | A1* | 10/2020 | Tamse | H04N 19/176 |
| 2021/0281852 | A1* | 9/2021 | Alshina | H04N 19/159 |
| 2022/0210459 | A1* | 6/2022 | Xu | H04N 19/50 |

FOREIGN PATENT DOCUMENTS

| | | |
|---|---|---|
| CN | 106464879 A | 2/2017 |
| CN | 107071418 A | 8/2017 |
| CN | 109963151 A | 7/2019 |
| CN | 110351556 A | 10/2019 |

OTHER PUBLICATIONS

Tencent Technology, ISR, PCT/CN2020/113153, Nov. 30, 2020, 2 pgs.
Tencent Technology, WO, PCT/CN2020/113153, Nov. 30, 2020, 3 pgs.
Tencent Technology, IPRP, PCT/CN2020/113153, Apr. 26, 2022, 4 pgs.

* cited by examiner

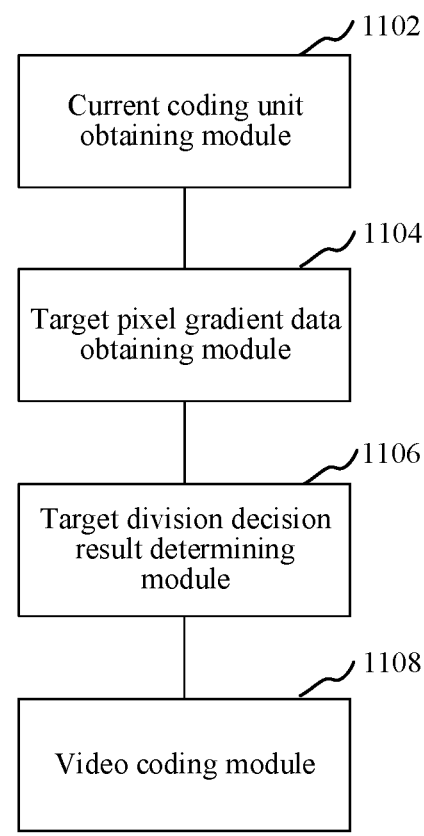

VIDEO CODING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2020/113153, entitled "VIDEO CODING METHOD AND APPARATUS, COMPUTER DEVICE, AND STORAGE MEDIUM" filed on Sep. 3, 2020, which claims priority to Chinese Patent Application No. 201911005290.8, entitled "VIDEO CODING METHOD AND APPARATUS, COMPUTER DEVICE, AND STORAGE MEDIUM" filed with the China National Intellectual Property Administration on Oct. 22, 2019, all of which are incorporated herein by reference in their entirety.

FIELD OF THE TECHNOLOGY

This application relates to the video field, and in particular, to a video coding method and apparatus, a computer device, and a storage medium.

BACKGROUND OF THE DISCLOSURE

With the rapid development and wide application of multimedia technologies and network technologies, a large amount of video information is used in people's daily life and production activities. To reduce an amount of transmitted data or stored data of videos, video coding is required.

During video coding, a frame of image is generally divided into a plurality of largest coding units (LCUs), the LCUs are then divided by using a division manner structure such as a quad tree (QT) to obtain coding subunits, and rate-distortion cost operation is then performed on each prediction mode of the LCUs and the coding subunits, to determine a division manner of a coding unit according to rate-distortion costs. However, a calculation amount of this method is large, leading to low video coding efficiency.

SUMMARY

According to various embodiments provided in this application, a video coding method and apparatus, a computer device, and a storage medium are provided.

A video coding method is provided, performed by a computer device, the method including: obtaining a current coding unit; obtaining target pixel gradient data through calculation according to a pixel value of a pixel in the current coding unit, the target pixel gradient data being obtained according to a difference between the pixel value of the pixel and a reference pixel value; determining a target division decision result corresponding to the current coding unit according to the target pixel gradient data; and performing video coding on the current coding unit according to the target division decision result.

A computer device is provided, including a memory and a processor, the memory storing computer-readable instructions, the computer-readable instructions, when executed by the processor, causing the computer device to perform the operations of the video coding method.

One or more non-transitory storage media storing computer-readable instructions are provided, the computer-readable instructions, when executed by one or more processors of a computer device, causing the computer device to perform the operations of the video coding method.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

FIG. 10 is a schematic diagram of dividing a target coding unit to obtain coding subunits according to some embodiments.

FIG. 11 is a structural block diagram of a video coding apparatus according to some embodiments.

DESCRIPTION OF EMBODIMENTS

To make the objectives, technical solutions, and advantages of this application clearer, the following further describes this application in detail with reference to the accompanying drawings and the embodiments. It is to be understood that the specific embodiments described herein are merely used to explain this application but are not intended to limit this application.

It may be understood that the terms "first", "second", and the like used in this application may be used for describing various elements in this specification. However, the elements are not limited by the terms unless otherwise specified. The terms are merely used for distinguishing a first element from another element. For example, without departing from the scope of this application, a first region may be referred to as a second region, and similarly, the second region may be referred to as the first region.

Figure 1:
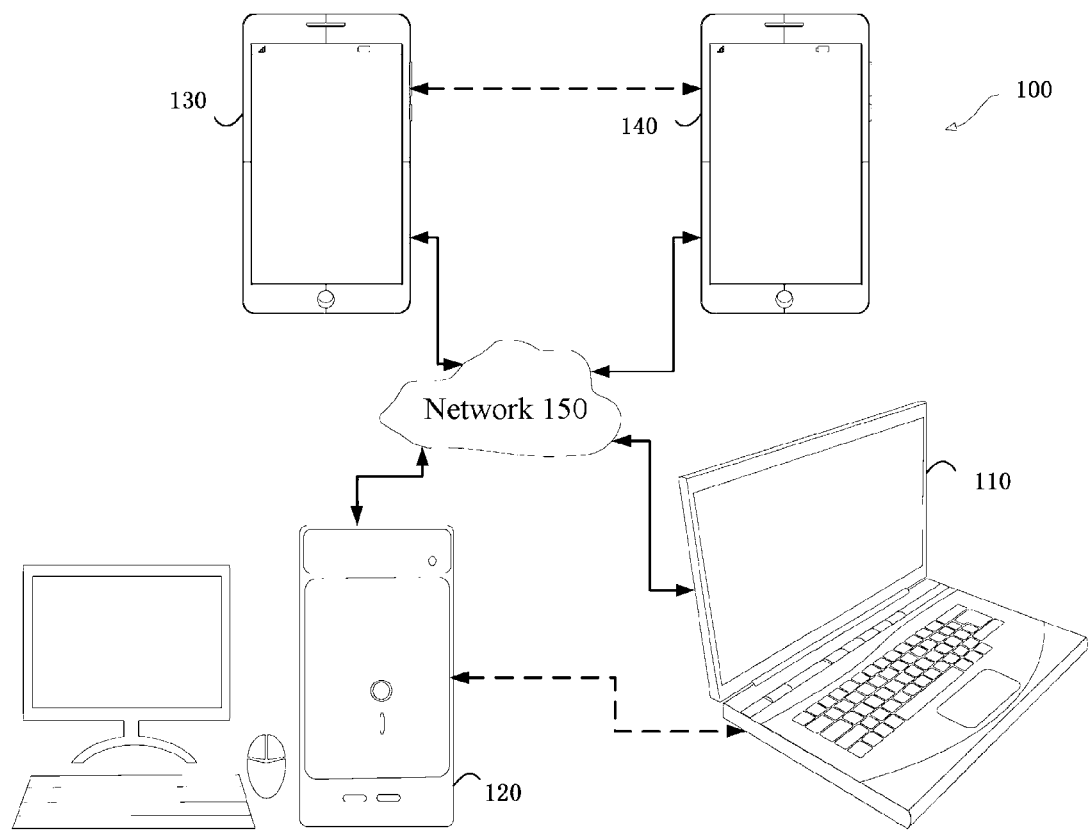
FIG. 1 is a block diagram of a communication system according to some embodiments.

FIG. 1 is a simplified block diagram of a communication system (100) according to an embodiment disclosed in this application. The communication system (100) includes a plurality of terminal devices, and for example, the terminal devices may communicate with each other through a network (150). For example, the communication system (100) includes a first terminal device (110) and a second terminal device (120) that are connected to each other through the network (150). In the embodiment of FIG. 1, the first terminal device (110) and the second terminal device (120) perform unidirectional data transmission. For example, the first terminal device (110) may encode video data (for example, video picture streams acquired by the terminal device (110)) to transmit the video data to the second terminal device (120) through the network (150). The coded video data is transmitted in the form of one or more coded video streams. The second terminal device (120) may receive the coded video data from the network (150), decode the coded video data to restore the video data, and display video pictures according to the restored video data. The unidirectional data transmission is quite common in applications such as media service.

In another embodiment, the communication system (100) includes a third terminal device (130) and a fourth terminal device (140) that perform bidirectional transmission of coded data video, and the bidirectional transmission may occur, for example, during a video conference. For bidirectional data transmission, each terminal device in the third terminal device (130) and the fourth terminal device (140) may encode video data (for example, video picture streams acquired by the terminal device), to transmit the video data to another terminal device in the third terminal device (130) and the fourth terminal device (140) through the network (150). Each terminal device in the third terminal device (130) and the fourth terminal device (140) may further receive coded video data transmitted by another terminal device in the third terminal device (130) and the fourth terminal device (140), decode the coded video data to restore video data, and display video pictures on an accessible display device according to the restored video data.

In the embodiment of FIG. 1, the first terminal device (110), the second terminal device (120), the third terminal device (130), and the fourth terminal device (140) may be a server, a personal computer, and a smartphone. However, the principle disclosed in this application is not limited thereto. The embodiments disclosed in this application are applicable to a laptop computer, a notebook computer, a media player, and/or a dedicated video conference device. The network (150) represents any quantity of networks that transmit coded video data among the first terminal device (110), the second terminal device (120), the third terminal device (130), and the fourth terminal device (140) and includes, for example, a wired (connected) and/or wireless communication network. The communication network (150) may exchange data in a circuit-switched or packet-switched channel. The network may include a telecommunications network, a local area network, a wide area network, and/or the Internet. For the purpose of this application, unless otherwise explained in the following, the structure and topology of the network (150) is insignificant for operations disclosed in this application.

Figure 2:
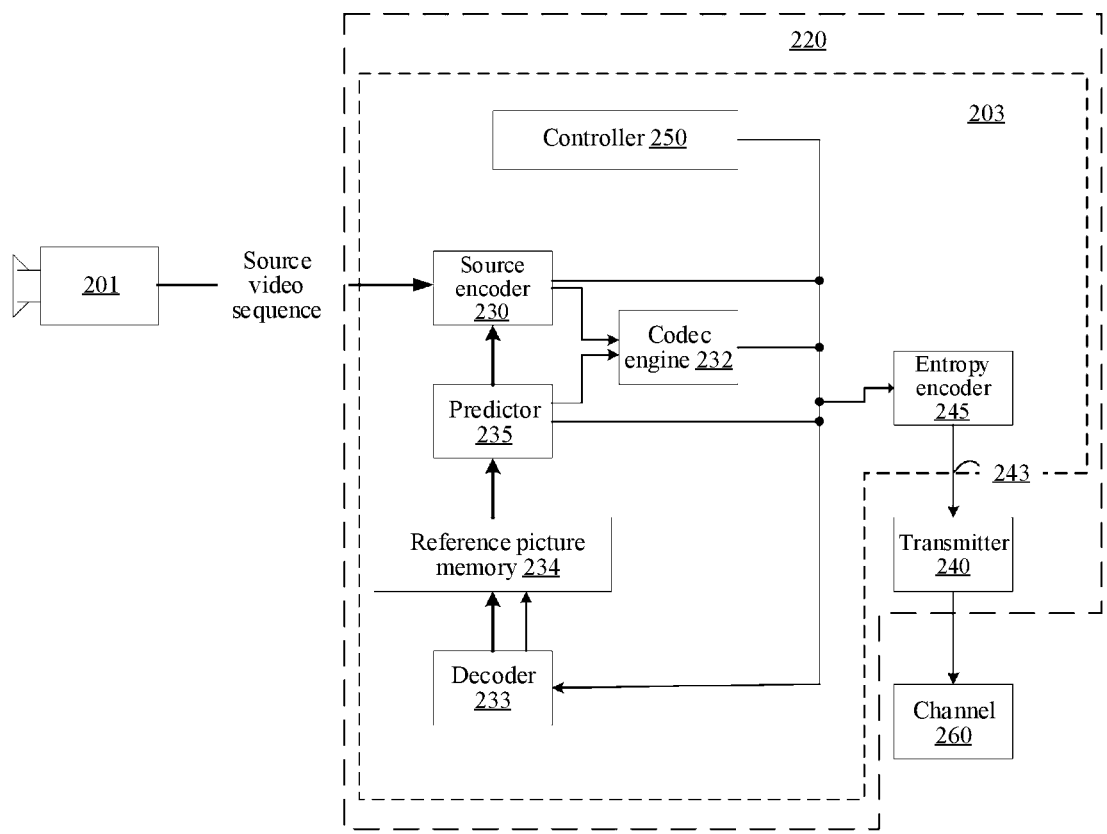
FIG. 2 is a block diagram of a video encoder according to some embodiments.

FIG. 2 is a block diagram of a video encoder (203) according to an embodiment disclosed in this application. The video encoder (203) is disposed in an electronic device (220). The electronic device (220) includes a transmitter (240) (for example, a transmission circuit).

The video encoder (203) may receive a video sample from a video source (201) (not a part of the electronic device (220) in the embodiment of FIG. 2), and the video source may acquire a video image coded by the video encoder (203). In another embodiment, the video source (201) is a part of the electronic device (220).

The video source (201) may provide a source video sequence that is coded by the video encoder (203) and represented in the form of a digital video sample stream, and the digital video sample stream may include any suitable bit depth (for example, 8 bits, 10 bits, or 12 bits), any color space (for example, BT.601 Y CrCB, or RGB), and any suitable sampling structure (for example, Y CrCb 4:2:0, or Y CrCb 4:4:4). In a media service system, the video source (201) may be a storage device storing videos prepared in advance. In a video conference system, the video source (201) may be a camera acquiring local image information as a video sequence. Video data may be provided as a plurality of independent pictures, and when viewed in sequence, these pictures are endowed with motion. The pictures may construct a spatial pixel array, which depends on a sampling structure, a color space, and the like that are used, and each pixel may include one or more samples. A person skilled in the art may easily understand a relationship between pixels and samples. The following focuses on description of samples.

According to an embodiment, the video encoder (203) may encode, in real time or in any other time constraint required by an application, pictures of a source video sequence and compress the pictures into a coded video sequence (243). Applying a suitable coding speed is a function of a controller (250). In some embodiments, the controller (250) controls other functional units described in the following and couples to these units in function. For brevity, coupling is not marked in the figure. Parameters set by the controller (250) may include rate control-related parameters (picture skipping, a quantizer, a λ value of a rate-distortion optimization technology, and the like), a size of a picture, a layout of a group of pictures, a maximum motion vector search range, and the like. The controller (250) may be configured to have other suitable functions, and these functions relate to the video encoder (203) for design optimization of a system.

In some embodiments, the video encoder (203) operates in a coding loop. As a simple description, in an embodiment, the coding loop may include a source encoder (230) (for example, responsible for creating a symbol such as a symbolic stream based on a to-be-coded input picture and a reference picture) and a (local) decoder (233) embedded in the video encoder (203). The decoder (233) reconstructs a symbol to create sample data in a manner similar to creating sample data by a (remote) decoder (in a video compression technology considered by this application, any compression between symbols and coded video streams is lossless). A reconstructed sample stream (sample data) is inputted into a reference picture memory (234). A bit accurate result not related to a position of the decoder (local or remote) is generated according to decoding of a symbol stream, so that content in the reference picture memory (234) also accurately corresponds to each other between a local encoder and a remote encoder. In other words, a reference picture sample "seen" by an encoder in a prediction part and a sample value "seen" by a decoder through prediction during decoding are totally the same. This reference picture synchronization basic principle (and drift generated when synchronization cannot be kept due to a channel error) is also applicable to some related technologies.

Operations of a "local" decoder (233) may be the same as that of a "remote" decoder, namely, the same as that of a decoder on a decoder side.

During operation, in some embodiments, the source encoder (230) may perform motion compensation predictive coding. The motion compensation predictive coding performs predictive coding on the input picture with reference to one or more previous coded pictures specified as a "reference picture" in the video sequence. In this way, a codec engine (232) encodes a difference between a pixel block of the input picture and a pixel block of a reference picture, and the reference picture may be selected as a predictive reference of the input picture.

The local video decoder (233) may decode, based on the symbol created by the source encoder (230), coded video data that may be specified as a reference picture. Operations of the codec engine (232) may be a lossy process. When the coded video data is decoded at the video decoder (not shown in FIG. 2), a reconstructed video sequence generally may be a replica carrying some errors of the source video sequence. The local video decoder (233) copies a decoding process, the decoding process may be performed by the video decoder on the reference picture, and a reconstructed reference picture may be stored in a reference picture cache (234). In this way, the video encoder (203) may store a replica of the reconstructed reference picture locally, and the replica and the reconstructed reference picture to be obtained by the remote video decoder have the same content (no transmission error exists).

A predictor (235) may perform predictive search for the codec engine (232). That is, for a to-be-coded new picture, the predictor (235) may search for sample data (as a candidate reference pixel block) that may be used as a suitable predictive reference of the new picture or some metadata such as a reference picture motion vector or a block shape in the reference picture memory (234). The predictor (235) may operate based on a sample block pixel by pixel, to find a suitable predictive reference. In some cases, according to a search result obtained by the predictor (235), it may be determined that the input picture may include a predictive reference obtained from a plurality of reference pictures stored in the reference picture memory (234).

The controller (250) may manage a coding operation of the source encoder (230), which includes, for example, setting a parameter and a subgroup parameter that are used for coding video data.

Entropy coding may be performed on outputs of all the foregoing functional units in an entropy encoder (245). The entropy encoder (245) performs lossless compression on symbols generated by various functional units according to technologies such as Huffman coding, variable length coding, and algorithm coding, to convert the symbols into a coded video sequence.

The transmitter (240) may buffer the coded video sequence created by the entropy encoder (245) to prepare for transmission through a communication channel (260), and the communication channel may be a hardware/software link to a storage device storing the coded video data. The transmitter (240) may merge the coded video data from the video encoder (203) and other data to be transmitted, and the other data is, for example, coded audio data and/or auxiliary data streams (sources are not shown).

The controller (250) may manage operations of the video encoder (203). During coding, the controller (250) may assign one coded picture type for each coded picture, which may affect a coding technology that may be applicable to a corresponding picture. For example, pictures generally may be assigned to any one picture type as follows:

Intra-frame picture (I picture): which may be a picture that may be coded and decoded without using any other picture in a sequence as a prediction source. Some video codecs tolerate intra-frame pictures of different types, which include, for example, independent decoder refresh (IDR) pictures. A person skilled in the art understands variants of the I picture and corresponding applications and features.

Predictive picture (P picture): which may be a picture that may be coded and decoded by using intra-frame prediction or inter-frame prediction, and the intra-frame prediction or inter-frame prediction uses at most one motion vector and a reference index to predict a sample value of each block.

Bidirectional predictive picture (B picture): which may be a picture that may be coded and decoded by using intra-frame prediction or inter-frame prediction, and the intra-frame prediction or inter-frame prediction uses at most two motion vectors and a reference index to predict a sample value of each block. Similarly, a plurality of predictive pictures may use more than two reference pictures and associated metadata to reconstruct a single block.

A source picture generally may be spatially subdivided into a plurality of sample blocks (for example, blocks of 4×4, 8×8, 4×8, or 16×16 samples), and coding is performed block by block. These blocks may perform predictive coding with reference to other (coded) blocks, and the other blocks are determined according to code assignment applicable to pictures corresponding to blocks. For example, a block of an I picture may perform non-predictive coding, or the block may perform predictive coding (spatial prediction or intra-frame prediction) with reference to a coded block of the same picture. A pixel block of a P picture may perform predictive coding through spatial prediction or time domain prediction with reference to a reference picture coded before. A pixel block of a B picture may perform predictive coding through spatial prediction or time domain prediction with reference to one or two reference pictures coded before.

The video encoder (203) may perform a coding operation according to a predetermined video coding technology or a standard of an ITU-T H.265 recommendation. During operation, the video encoder (203) may perform various compression operations, including a predictive coding operation using temporal redundancy and spatial redundancy in an inputted video sequence. Therefore, coded video data may conform to the used video coding technology or a grammar specified by the standard.

In an embodiment, the transmitter (240) may transmit extra data when transmitting the coded video data. The source encoder (230) may use this type of data as a part of a coded video sequence. The extra data may include a time/spatial/SNR reinforcement layer, redundant pictures, and redundant data in other forms such as a slice, SEI messages, and VUI parameter set segments.

An acquired video may be used as a plurality of source pictures (video pictures) in a time sequence. Intra-frame picture prediction (generally simplified into intra-frame prediction) uses spatial correlation in a given picture, and inter-frame picture prediction uses (time or other) correlation between pictures. In an embodiment, a given picture during coding/decoding is divided into blocks, and the given picture during coding/decoding is referred to as a current picture. When a block in the current picture is similar to a reference block in a reference picture that is coded before but is still buffered in the video, the block in the current picture may be coded by using a vector referred to as a motion vector. When the motion vector points to the reference block in the reference picture and a plurality of reference pictures are used, the motion vector may include a third dimension for identifying the reference picture.

In some embodiments, a bidirectional prediction technology may be applicable to inter-frame picture prediction. According to the bidirectional prediction technology, two reference pictures are used, such as a first reference picture and a second reference picture before (which may be respectively past and future according to a display sequence) the current picture according to a decoding sequence in the video. The block in the current picture may be coded by using a first motion vector pointing to a first reference block in the first reference picture and a second motion vector pointing to a second reference block in the second reference picture. Specifically, the block may be predicted by using a combination of the first reference block and the second reference block.

In addition, a merge mode technology may be applicable to inter-frame picture prediction to improve the coding efficiency.

According to some embodiments disclosed in this application, implementation of prediction such as intra-frame picture prediction and inter-frame picture prediction uses a block as a unit. For example, according to a HEVC standard, a picture in a video picture sequence is divided into coding tree units (CTUs) for compression, and CTUS in the picture include the same size, such as 64×64 pixels, 32×32 pixels, or 16×16 pixels. Generally speaking, a CTU includes three coding tree blocks (CTBs), and the three CTBs are one luminance CTB and two chroma CTBs. Further, each CTU may be further divided into one or more coding units (CUs) by using a quad tree. For example, a CTU of 64×64 pixels may be divided into a CU of 64×64 pixels, or 4 CUs of 32×32 pixels, or 16 CUs of 16×16 pixels. In an embodiment, each CU is analyzed to determine a prediction type for the CU, such as an intra-frame prediction type or an inter-frame prediction type. In addition, depending on the time and/or spatial predictability, a CU is divided into one or more prediction units (PUs). Generally, each PU includes a luminance prediction block (PB) and two chroma PBs. In an embodiment, a prediction operation during coding (coding/decoding) is performed by using a PB as a unit. Taking an example in which a luminance PB is used as a PB, the PB includes a matrix of a pixel value (for example, a luminance value), such as 8×8 pixels, 16×16 pixels, 8×16 pixels, and 16×8 pixels.

Figure 3:
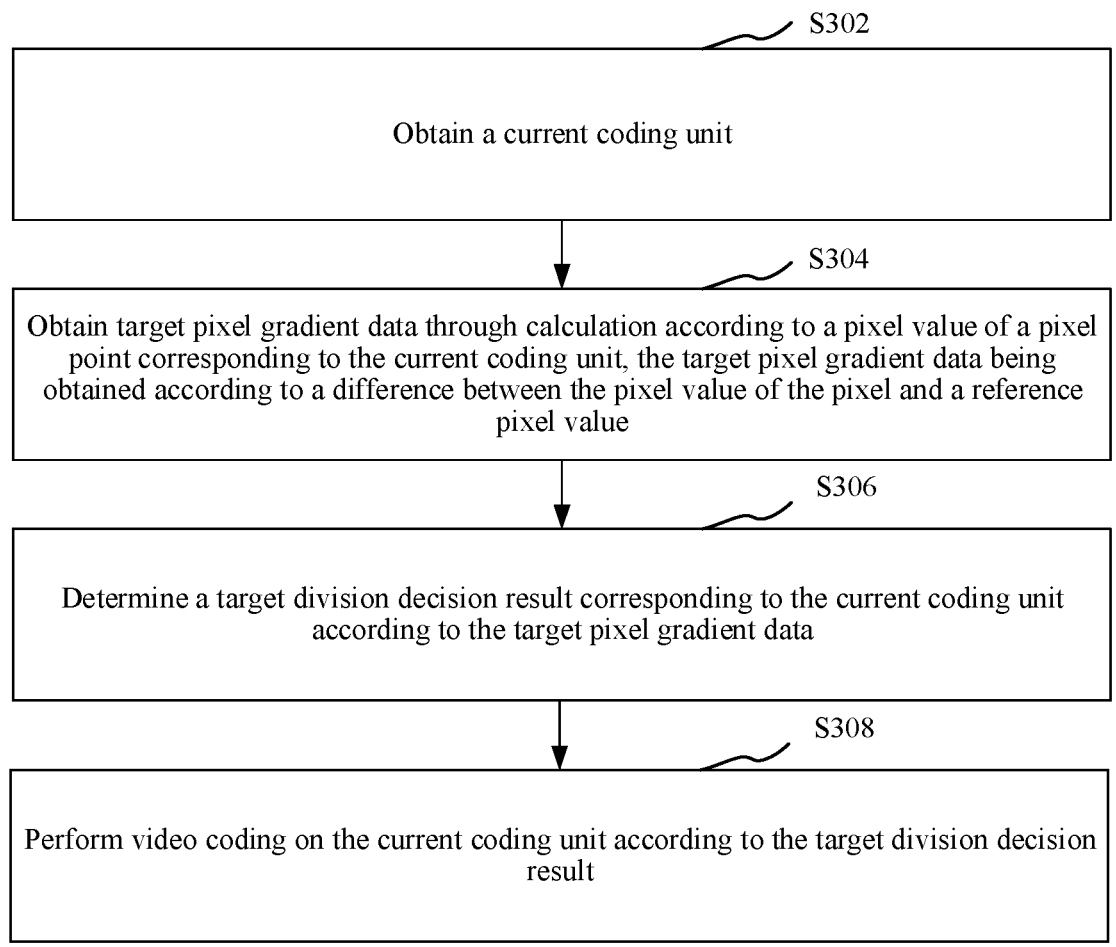
FIG. 3 is a flowchart of a video coding method according to some embodiments.

As shown in FIG. 3, in some embodiments, a video coding method is provided, and description is made in this embodiment mainly by using an example in which the method is applicable to the terminal device in FIG. 1. The method may specifically include the following steps:

Step S302: Obtain a current coding unit.

Specifically, the current coding unit is coding unit that needs to be determined whether to divide. During video coding, video frames may be obtained, and a video image frame is divided by using a largest coding unit (LCU) as a unit. That is, the video frame image may be divided into a plurality of LCUs of a preset size, and whether the coding unit may be divided into small coding units (CUs) is recursively determined until the coding unit is divided into smallest coding units, so as to form a coding unit tree structure. The target coding unit may be a LCU or may be a CU obtained by dividing the LCU. For example, when a video image frame is obtained, it is assumed that the LCU is 64×64 pixels, the terminal device may divide the video image frame into a plurality of LCUs with 64×64 pixels, and use the LCUs as the current coding unit. After the LCU is divided, and 4 CUs (32×32 pixels) are obtained, the 4 CUs obtained through division may be used as the current coding unit.

Certainly, the foregoing only using a LCU division manner as an example to describe an implementation of the solution of this application, but this application is not limited to the foregoing division manner.

Step S304: Obtain target pixel gradient data through calculation according to a pixel value of a pixel in the current coding unit, the target pixel gradient data being obtained according to a difference between the pixel value of the pixel and a reference pixel value.

Specifically, a pixel gradient reflects changes of a pixel value in an image. A larger pixel gradient indicates a larger pixel change and indicates a larger image content change of a CU; and a smaller pixel gradient indicates a smaller pixel change and indicates a smaller image content change of a CU. A pixel gradient may be obtained by using a difference between a pixel value of a pixel and a reference pixel value, and a larger difference indicates a larger gradient. The difference may be represented by using a difference value or may be represented by using a ratio. For example, the reference pixel value may be subtracted from the pixel value of the pixel, and an absolute value of a difference value is used as a pixel difference. Alternatively, the pixel value of the pixel may be divided by the reference pixel value, and an obtained ratio is used as a pixel difference.

The pixel gradient data is data related to the pixel gradient, for example, may include at least one of the pixel gradient or a difference between pixel gradients. The reference pixel value is a referenced pixel value for determining the pixel gradient. The reference pixel value may be obtained according to a pixel value of the current coding unit. For example, a pixel value of any pixel in the current coding unit may be selected as the reference pixel value, or pixel values of the current coding unit are counted, a pixel average value is obtained through calculation, and the pixel average value obtained through calculation is used as the reference pixel value.

In some embodiments, differences between pixel values of pixels and the reference pixel value may be calculated, namely, pixel gradients corresponding to the pixels, and target pixel gradient data is obtained through calculation by combining the pixel gradients of the pixels. For example, the pixel gradients of the pixels are accumulated, to obtain the target pixel gradient data.

In some embodiments, in the current coding unit, reference pixels corresponding to different pixels may be different, and a pixel value of a reference pixel corresponding to the pixel may be used as the reference pixel value. For example, a pixel value of an adjacent pixel of the pixel may be used as the reference pixel value. The terminal device may use a pixel value of one adjacent pixel as the reference pixel value, or may combine pixel values of a plurality of adjacent pixels as the reference pixel value, for example, may use a pixel average value of the adjacent pixels as the reference pixel value.

In some embodiments, there may be one or a plurality of pieces of target pixel gradient data. For example, the target pixel gradient data may include at least one of global gradient data or local gradient data. The global gradient data is obtained according to a difference between the pixel value of the pixel and a pixel average value. That is, the reference pixel value may be a pixel average value to reflect an entire pixel change of the current coding unit. The local gradient data is obtained according to a difference between the pixel value of the pixel and a pixel value of another pixel in the current coding unit. That is, when a pixel gradient corresponding to a pixel is calculated, a difference between a pixel value of the pixel and a pixel value of another pixel in the current coding unit may be calculated, to obtain a pixel gradient corresponding to the pixel, where the another pixel used as a reference pixel may be a pixel adjacent to the pixel.

Step S306: Determine a target division decision result corresponding to the current coding unit according to the target pixel gradient data.

Specifically, the target division decision result may be stop division or division. That is, a candidate division decision result may include stop division and perform division. The stop division refers to not dividing the current coding unit. The division refers to that there is a need to divide the current coding unit into a plurality of coding subunits.

In some embodiments, the target division decision result may alternatively be not determined, and if the target division decision result is not determined, whether there is a need to divide the current coding unit may be determined according to a conventional method for determining a division manner of a coding unit. For example, rate-distortion costs of coding subunits obtained after the current coding unit is divided may be calculated, a sum of the rate-distortion costs corresponding to the coding subunits is counted and compared with a rate-distortion cost corresponding to a case that the current coding unit is not divided, and if the sum of the rate-distortion costs corresponding to the coding subunits is smaller, there is a need to divide the current coding unit. If the rate-distortion cost corresponding to the case that the current coding unit is not divided is smaller, there is no need to divide the current coding unit.

When the target division decision result corresponding to the current coding unit is determined according to the target pixel gradient data, the target pixel gradient data may be compared with a preset threshold, if the target pixel gradient data is smaller than a preset first gradient threshold, it indicates that a gradient difference or a gradient is relatively small, the content change of the current coding unit is small, and the division decision result may be stop division. If the target pixel gradient data is greater than a preset second gradient threshold, it indicates that the gradient difference or the gradient is relatively large, and the division decision result may be division. The second gradient threshold may be greater than or equal to the first gradient threshold.

In some embodiments, when there are a plurality of pieces of target pixel gradient data, it may be that all the target pixel gradient data or target pixel gradient data exceeding a preset quantity is smaller than the preset first gradient threshold, the division decision result is stop division. Alternatively, it may be that all the target pixel gradient data or target pixel gradient data exceeding a preset quantity is greater than the preset second gradient threshold, the division decision result is division.

Step S308: Perform video coding on the current coding unit according to the target division decision result.

Specifically, after the target division decision result is obtained, video coding may be performed on the current coding unit according to the target division decision result.

In some embodiments, when the target division decision result is stop division, video coding is performed by using the current coding unit as a coding unit. When the target division decision result corresponding to the current coding unit is stop division, a later division process of the current coding unit is directly stopped, and whether the current coding unit needs to be divided is no longer determined according to the rate-distortion cost, thereby saving coding time. When it is determined to stop division, the terminal device may use the current coding unit as a unit obtaining a reference block (reference unit), obtaining a reference block corresponding to the current coding unit, obtain a predicted pixel value of the current coding unit according to the reference block, subtract the predicted pixel value from a real pixel value of the current coding unit to obtain a predicted residual, perform processing such as quantification and entropy coding on the predicted residual to obtain coded data, and store the coded data locally or transmit the coded data to another terminal device.

In some embodiments, when the target division decision result is division, the terminal device divides the current coding unit to obtain a plurality of coding subunits, and performs video coding according to the coding subunits.

Specifically, when the target division decision result is division, intra-frame prediction is performed on the current coding unit, a process of determining a rate-distortion cost may be omitted, and the current coding unit may be directly divided, thereby reducing a rate distortion optimization calculation process of the current coding unit. The division manner may be set as required, for example, may be quad tree division, triple tree division, or binary tree division. M-tree division refers to dividing the current coding unit into M parts. M may be an integer greater than or equal to 2. For a coding subunit obtained through division, if the coding subunit is a smallest coding unit defined in a video coding standard, the coding subunit may not be divided again. If the coding subunit is not the smallest coding unit defined in the video coding standard, the coding subunit may be used as a new target coding unit to continue to perform division decision.

According to the foregoing video coding method, target pixel gradient data may be obtained through calculation according to pixel values of coding units, and the target pixel gradient data is obtained according to a difference between a pixel value of a pixel and a reference pixel value, so that an image change condition of the current coding unit may be reflected. Therefore, the accuracy of a target division decision result corresponding to the current coding unit determined according to the target pixel gradient data is high, and a time for obtaining a division decision result may be reduced, thereby shortening the coding time of video coding and improving the video coding efficiency.

Figure 4:
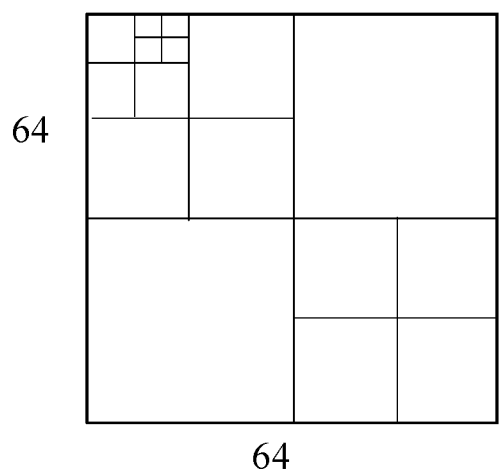
FIG. 4 is a schematic diagram of division of image blocks according to some embodiments.

For example, FIG. 4 is a schematic diagram of dividing an image block of 64×64 pixels. One block represents one coded block. The image block of 64×64 pixels may be first used as a target coding unit to perform the method provided in the embodiments of this application, to obtain that the division decision result of the current coding unit is division. Therefore, the image blocks of 64×64 pixels may be divided into 4 coding subunits. The 4 coding subunits are used as new target coding units to continue to perform the method provided in the embodiments of this application until a coding unit of 4×4 pixels is obtained through division, and since the coding unit of 4×4 pixels is the smallest coding unit of the video coding standard, the division decision may be stopped.

Figure 5:
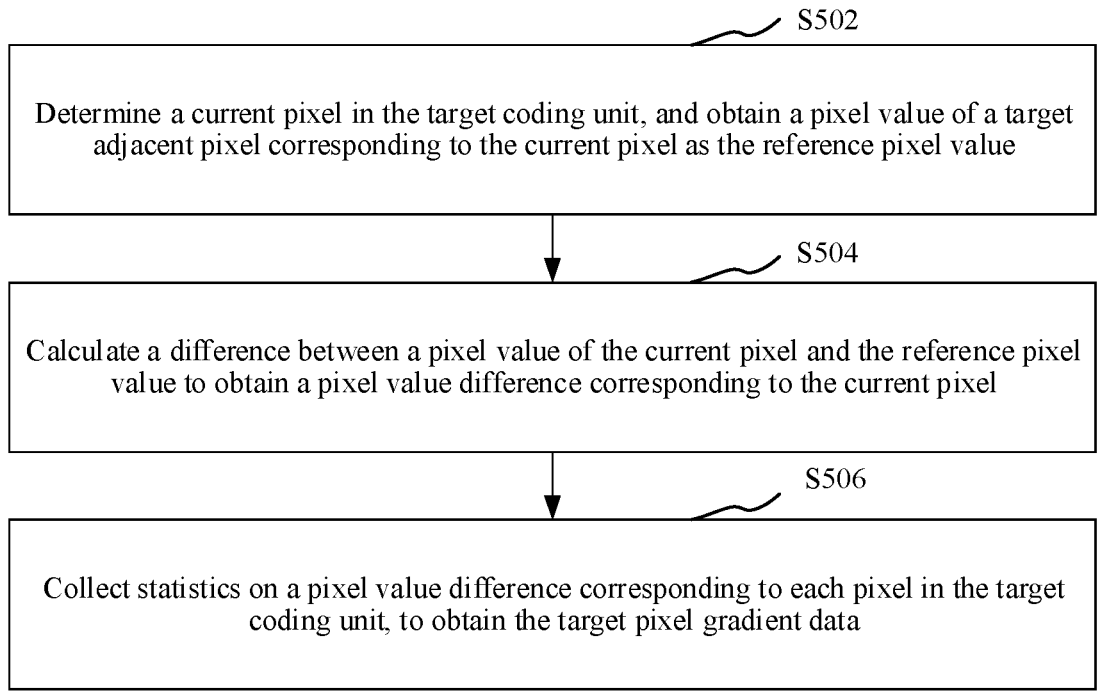
FIG. 5 is a flowchart of obtaining target pixel gradient data through calculation according to a pixel value of a pixel corresponding to a target coding unit according to some embodiments.

In some embodiments, as shown in FIG. 5, step S304 of obtaining target pixel gradient data through calculation according to a pixel value of a pixel in the current coding unit includes the following steps:

Step S502: Determine a current pixel in the current coding unit, and obtain a pixel value of a target adjacent pixel corresponding to the current pixel as the reference pixel value.

Figure 6:
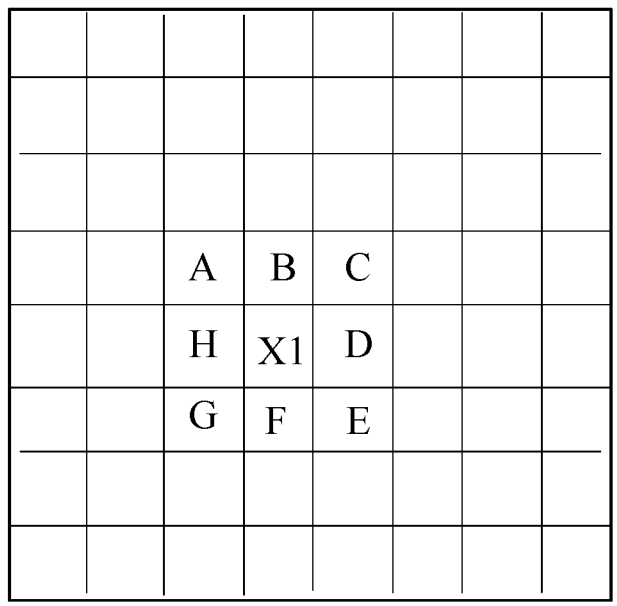
FIG. 6 is a schematic diagram of obtaining a target adjacent pixel corresponding to a current pixel according to some embodiments.

Specifically, the current pixel refers to a pixel of which a pixel gradient needs to be calculated currently in the current coding unit. Each pixel at the same moment may be used as the current pixel, or a plurality of pixels are used as the current pixel one by one. The target adjacent pixel may be one or more pixels adjacent to the current pixel. For example, as shown in FIG. 6, one small square represents one pixel, it is assumed that the current pixel in the current coding unit is X1, the target adjacent pixel may be all pixels from A to H, or one or more pixels are selected from A to H as the target adjacent pixel.

In some embodiments, a target gradient calculation direction may be obtained, and an adjacent pixel corresponding to the current pixel in the target gradient calculation direction is obtained as the target adjacent pixel.

Figure 7:
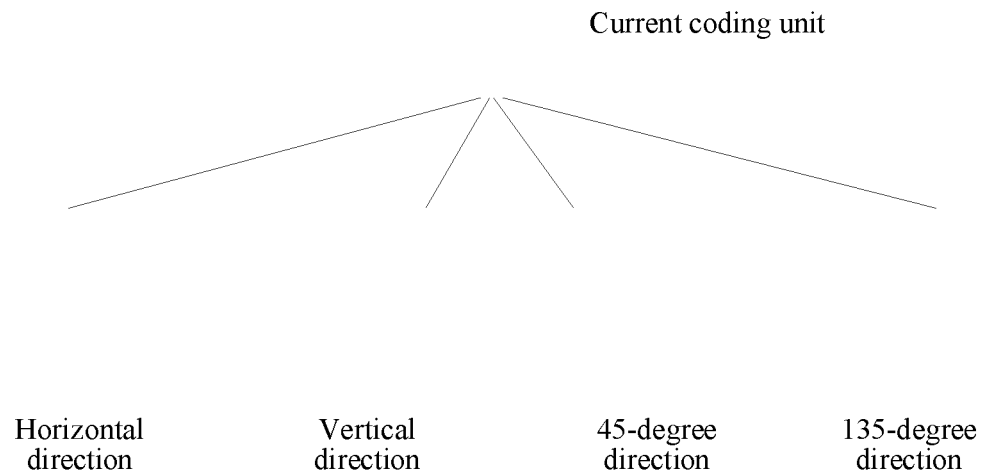
FIG. 7 is a schematic diagram of gradient calculation directions according to some embodiments.

Specifically, the target gradient calculation direction refers to a direction for calculating gradients, and the target calculation direction may be determined as required. For example, the gradient calculation direction may include at least one of a horizontal direction, a vertical direction, a 45-degree direction, or a 135-degree direction. The horizontal direction may refer to a direction from left to right or from right to left, and the vertical direction may refer to a direction from top to bottom or from bottom to top. The 45-degree direction refers to a direction from a bottom left corner to a top right corner of the current coding unit, and the 135-degree direction refers to a direction from a bottom right corner to a top left corner of the current coding unit. FIG. 7 is a schematic diagram of gradient calculation directions according to some embodiments.

The adjacent pixel corresponding to the current pixel in the target gradient calculation direction refers to a forward adjacent pixel of the current pixel in the target gradient calculation direction, and the forward adjacent pixel refers to an adjacent pixel in front of the current pixel in the target gradient calculation direction. For example, if it is assumed that the target gradient calculation direction is the horizontal direction in FIG. 7, the target adjacent pixel for the current pixel X1 is H. If it is assumed that the target gradient calculation direction is the vertical direction in FIG. 7, the target adjacent pixel for the current pixel X1 is B. If it is assumed that the target gradient calculation direction is the 45-degree direction in FIG. 7, the target adjacent pixel for the current pixel X1 is G. If it is assumed that the target gradient calculation direction is the 135-degree direction in FIG. 7, the target adjacent pixel for the current pixel X1 is E.

Step S504: Calculate a difference between a pixel value of the current pixel and the reference pixel value to obtain a pixel value difference corresponding to the current pixel.

Specifically, the difference between the pixel value of the current pixel and the reference pixel value may be obtained according to a difference value. For example, the difference may be an absolute value of the difference value or may be a square of the difference value.

Step S506: Collect statistics on a pixel value difference corresponding to each pixel in the current coding unit, to obtain the target pixel gradient data.

Specifically, the statistics collection may be calculating an average value or calculating a median. For example, sum calculation is performed on the pixel value difference corresponding to each pixel in the current coding unit, and an obtained sum is divided by a quantity of pixels to obtain the target pixel gradient data.

In some embodiments, the target pixel gradient data may include local pixel gradients corresponding to one or more target gradient calculation directions. For example, local pixel gradients respectively corresponding to the horizontal direction, the vertical direction, the 45-degree direction, and the 135-degree direction are included. The local pixel gradients respectively corresponding to the horizontal direction, the vertical direction, the 45-degree direction, and the 135-degree direction may be respectively represented by using formulas (1) to (4). In the formulas, LocalGradient represents a local pixel gradient, and LocalGradient_HOR represents a local pixel gradient in the horizontal direction. LocalGradient_VER represents a local pixel gradient in the vertical direction. LocalGradient_45 represents a local pixel gradient in the 45-degree direction. LocalGradient_135 represents a local pixel gradient in the 135-degree direction. Width represents a quantity of pixels in a width direction, namely, the horizontal direction, and Height represents a quantity of pixels in a height direction, namely, the vertical direction. P represents a pixel value, for example, $P_{i,j}$ represents a value of a pixel at an $i^{th}$ row and $j^{th}$ column in the current coding unit, abs represents calculating an absolute value, and $\Sigma$ represents calculating a sum.

$$\text{LocalGradient\_Hor} = \sum_{i=0}^{Width-2} \sum_{j=0}^{Height-1} \text{abs}(p_{i+1,j} - p_{i,j}) \quad (1)$$

$$\text{LocalGradient\_Ver} = \sum_{i=0}^{Width-1} \sum_{j=0}^{Height-2} \text{abs}(p_{i,j+1} - p_{i,j}) \quad (2)$$

$$\text{LocalGradient\_45} = \sum_{i=1}^{Width-2} \sum_{j=1}^{Height-2} \text{abs}(p_{i,j} - p_{i+1,j-1}) \quad (3)$$

$$\text{LocalGradient\_135} = \sum_{i=1}^{Width-2} \sum_{j=1}^{Height-2} \text{abs}(p_{i,j} - p_{i-1,j-1}) \quad (4)$$

In some embodiments, step S304 of obtaining target pixel gradient data through calculation according to a pixel value of a pixel in the current coding unit includes the following steps: dividing the current coding unit into a plurality of regions, and calculating a pixel gradient corresponding to each region, the pixel gradient corresponding to each region being obtained according to a difference between a pixel value of a pixel corresponding to each region and the reference pixel value; and calculating a pixel gradient difference between the regions to obtain the target pixel gradient data.

Specifically, the plurality of refers to more than two, where two is included. A method for dividing the target coding region into a plurality of regions may be set as required. For example, the current coding unit may be divided into two regions. The method for dividing the current coding unit into two regions may be at least one of horizontal division, vertical division, or diagonal division. For example, if the current coding unit is a square block, namely, quantities of pixels in a length direction and in a width direction are the same, horizontal division, vertical division, and diagonal division may be performed. If the current coding unit is a non-square block and the width is greater than the height, vertical division may be performed to divide the current coding unit into a left half part and a right half part. If the height is greater than the width, horizontal division may be performed to divide the current coding unit into a top half part and a bottom half part.

The reference pixel value may be a pixel average value, and the pixel average value may be a pixel average value of pixels corresponding to the current coding unit or may be a pixel average value of pixels corresponding to the region. Certainly, the reference pixel value may alternatively be a pixel value of an adjacent pixel of the pixel. The pixel gradient difference between regions may be represented by using an absolute value of a pixel gradient difference value between the two regions, a square of the difference value, or a ratio value. The pixel gradient corresponding to a region may be a statistical value of pixel differences corresponding to the pixels in the region, such as a sum or an average value of the pixel differences corresponding to the pixels in the region.

In some embodiments, the calculating a pixel gradient difference between the regions includes: subtracting a pixel gradient corresponding to a second region from a pixel gradient corresponding to a first region to obtain a pixel gradient difference between the first region and the second region. The first region and the second region may be any region corresponding to the current coding unit, for example, the first region may be the top half part of the current coding unit, and the second region may be the bottom half part of the current coding unit.

In some embodiments, a gradient has a direction, for example, a gradient in the horizontal direction and a gradient in the vertical direction may be included. For the same coding unit, gradients corresponding to different directions represent different meanings. Therefore, when gradient comparison such as gradient subtraction is performed, subtraction is performed on pixel gradients in the same direction. For example, subtraction is performed on a pixel gradient in the vertical direction in the first region and a pixel gradient in the vertical direction in the second region.

Figure 8:
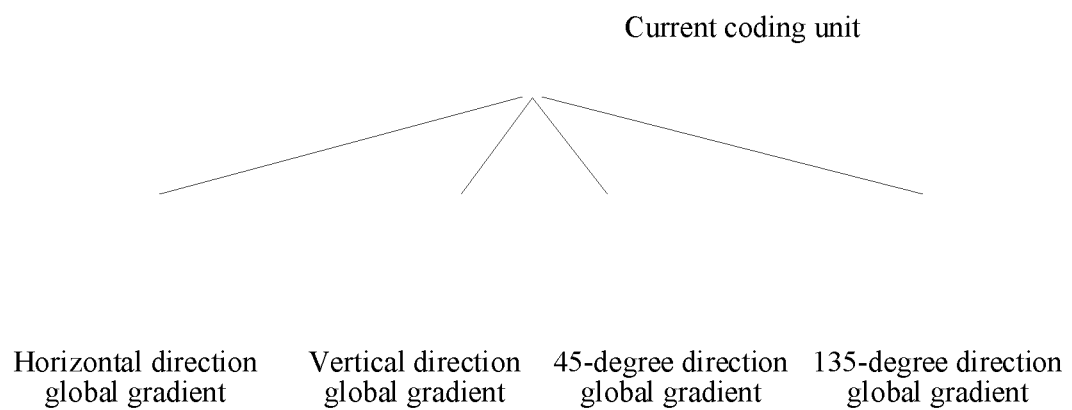
FIG. 8 is a schematic diagram of gradient calculation directions according to some embodiments.

In some embodiments, the target pixel gradient data may include gradient differences of global pixel gradients corresponding to one or more gradient calculation directions. For example, gradient differences of global pixel gradients respectively corresponding to the horizontal direction, the vertical direction, the 45-degree direction, and the 135-degree direction are included. As shown in FIG. 8, a global pixel gradient difference of the horizontal direction may be a difference between global pixel gradients of the left half part and the right half part. A global pixel gradient difference of the vertical direction may be a difference between global pixel gradients of the top half part and the bottom half part. A global pixel gradient difference of the 45-degree direction may be a difference between global pixel gradients of a bottom left part and a top right part. A global pixel gradient difference of the 135-degree direction may be a difference between global pixel gradients of a top left part and a bottom right part.

In some embodiments, the global pixel gradient differences respectively corresponding to the horizontal direction, the vertical direction, the 45-degree direction, and the 135-degree direction may be respectively represented by using formulas (5) to (8). In the formulas, GlobalGradient represents a global pixel gradient, and GlobalGradient_HOR represents a global pixel gradient difference in the horizontal direction. GlobalGradient_VER represents a global pixel gradient difference in the vertical direction. GlobalGradient_45 represents a global pixel gradient difference in the 45-degree direction. GlobalGradient_135 represents a global pixel gradient difference in the 135-degree direction. N represents quantities of pixels in the length direction and in the width direction, and description is made herein by using an example in which the quantities of pixels in the length direction and in the width direction of the current coding unit are the same. It may be understood that, the quantities of pixels in the length direction and in the width direction of the current coding unit may alternatively be different. abs represents calculating an absolute value, and represents calculating a sum. P represents a pixel value, for example, $P_{i,j}$ represents a value of a pixel at an $i^{th}$ row and a $j^{th}$ column in the current coding unit. $P_{avg}$ represents a pixel average value.

$$\text{GlobalGradient\_Hor} = \text{abs}\left(\sum_{i=0}^{N-1}\sum_{j=0}^{N/2-1}|p_{ij} - p_{avg}| - \sum_{i=0}^{N-1}\sum_{j=N/2}^{N-1}|p_{ij} - p_{avg}|\right) \quad (5)$$

$$\text{GlobalGradient\_Ver} = \text{abs}\left(\sum_{i=0}^{N/2-1}\sum_{j=0}^{N-1}|p_{ij} - p_{avg}| - \sum_{i=N/2}^{N-1}\sum_{j=0}^{N-1}|p_{ij} - p_{avg}|\right) \quad (6)$$

$$\text{GlobalGradient\_45} = \text{abs}\left(\sum_{i=0}^{N-1}\sum_{j=i}^{N-1}|p_{ij} - p_{avg}| - \sum_{i=0}^{N-1}\sum_{j=0}^{i}|p_{ij} - p_{avg}|\right) \quad (7)$$

$$\text{GlobalGradient\_135} = \quad (8)$$
$$\text{abs}\left(\sum_{i=0}^{N-1}\sum_{i=0}^{N-1-i}|p_{ij} - p_{avg}| - \sum_{i=0}^{N-1}\sum_{j=N-1-i}^{N-1}|p_{ij} - p_{avg}|\right)$$

In some embodiments, whether the target pixel gradient data meets a first threshold condition may be determined, and when the target pixel gradient data meets the first threshold condition, the target division decision result corresponding to the current coding unit is determined as stop division. The first threshold condition includes a quantity of target pixel gradient data less than a corresponding first threshold meeting a first quantity.

Specifically, the meeting a first quantity refers to being greater than or equal to the first quantity. The first quantity may be set as required, for example, may be a quantity corresponding to all target pixel gradient data, or may be a quantity corresponding to a part of the target pixel gradient data, and the first quantity may alternatively be a preset value such as 5. If the quantity of target pixel gradient data less than the corresponding first threshold is greater than or equal to the first quantity, it indicates that an image content change of the current coding unit is relatively small, a condition of not performing division is met, and division may be stopped.

In some embodiments, the first threshold may be obtained through experience or experiments. For example, target pixel gradient data respectively corresponding to division and stop division in video frames of different content may be counted, and a value that causes an accurate rate of the decision of stop division to meet a preset accurate rate such as 90% is selected as the first threshold.

In some embodiments, different quantization parameters may correspond to different first thresholds, and target coding units of different sizes may also correspond to different first thresholds. For example, when different quantization parameters are obtained through experimental statistics, a gradient value that causes the accurate rate of the decision of stop division to meet the preset accurate rate may be used as the first threshold.

In some embodiments, different target pixel gradient data may correspond to different first thresholds. For example, according to experiments, target pixel gradient data in the 45-degree direction and in the 135-degree direction may be greater than target pixel gradient data in the horizontal direction and in the vertical direction. Therefore, a relatively large first threshold may be set for the target pixel gradient data in the 45-degree direction and in the 135-degree direction, that is, the first threshold corresponding to the target pixel gradient data in the 45-degree direction and in the 135-degree direction is greater than a first threshold corresponding to the target pixel gradient data in the horizontal direction and in the vertical direction. For example, the first threshold corresponding to the target pixel gradient data in the 45-degree direction and in the 135-degree direction may be a times of the first threshold corresponding to the target pixel gradient data in the horizontal direction and in the vertical direction, a is greater than 1 and may be 1.414. In another example, a first threshold corresponding to a global gradient and a first threshold corresponding to a local gradient may be different.

In some embodiments, the first threshold may change. For example, a first threshold corresponding to a first CTU of a video frame may be preset. For another CTU with an adjacent CTU, target pixel gradient data corresponding to the adjacent CTU may be obtained, and a first threshold may be obtained according to the target pixel gradient data corresponding to the adjacent CTU. For example, maximum gradient data in an above CTU and a CTU on the left of the CTU may be used as the first threshold. Alternatively, average gradient data of the above CTU and the CTU on the left may be used as the first threshold. A similarity of adjacent CTU is relatively high, by updating the first threshold by using the target pixel gradient data corresponding to the adjacent CTU, a determination condition of a division decision result may change dynamically along with changes of the image content, thereby improving the accuracy of the division decision result.

In some embodiments, the determining a target division decision result corresponding to the current coding unit according to the target pixel gradient data includes: determining, when the target pixel gradient data meets a second threshold condition, the target division decision result corresponding to the current coding unit as division, the second threshold condition including a quantity of target pixel gradient data greater than a corresponding second threshold meeting a second quantity.

Specifically, the meeting a second quantity refers to being greater than or equal to the second quantity, and the first threshold and the second threshold may be the same or may be different. The second quantity may be set as required, for example, may be a quantity corresponding to all target pixel gradient data, or may be a quantity corresponding to a part of the target pixel gradient data. If the quantity of target pixel gradient data greater than the corresponding second threshold meets the second quantity, it indicates that an image content change of the current coding unit is relatively large, a condition of performing division is met, and division may be performed on the current coding unit.

In some embodiments, whether the target pixel gradient data meets the first threshold condition and the second threshold condition may be determined at the same time. Alternatively, whether the target pixel gradient data meets the first threshold condition may be determined first, and when the target pixel gradient data meets the first threshold condition, whether the target pixel gradient data meets the second threshold condition is not determined, to reduce the calculation complexity.

In some embodiments, the terminal device may determine to use the first threshold condition or the second threshold condition to determine the target division decision result for different cases. For example, when division may be performed according to the current coding unit, a threshold condition and a corresponding division decision result are determined according to a quantity of obtained subunits. For example, if the division is quad tree (QT) division, whether the target pixel gradient data meets the first threshold condition may be determined, for example, whether all the target pixel gradient data is less than the first threshold may be determined, if yes, it is determined that the target division decision result corresponding to the current coding unit is stop division. If the division is triple tree (TT) division or binary tree (BT) division, since a quantity of subunits obtained through division is relatively small, the condition may be softened, so that whether all the target pixel gradient data is greater than the second threshold may be determined, if yes, it is determined that the target division decision result corresponding to the current coding unit is division.

Figure 9:
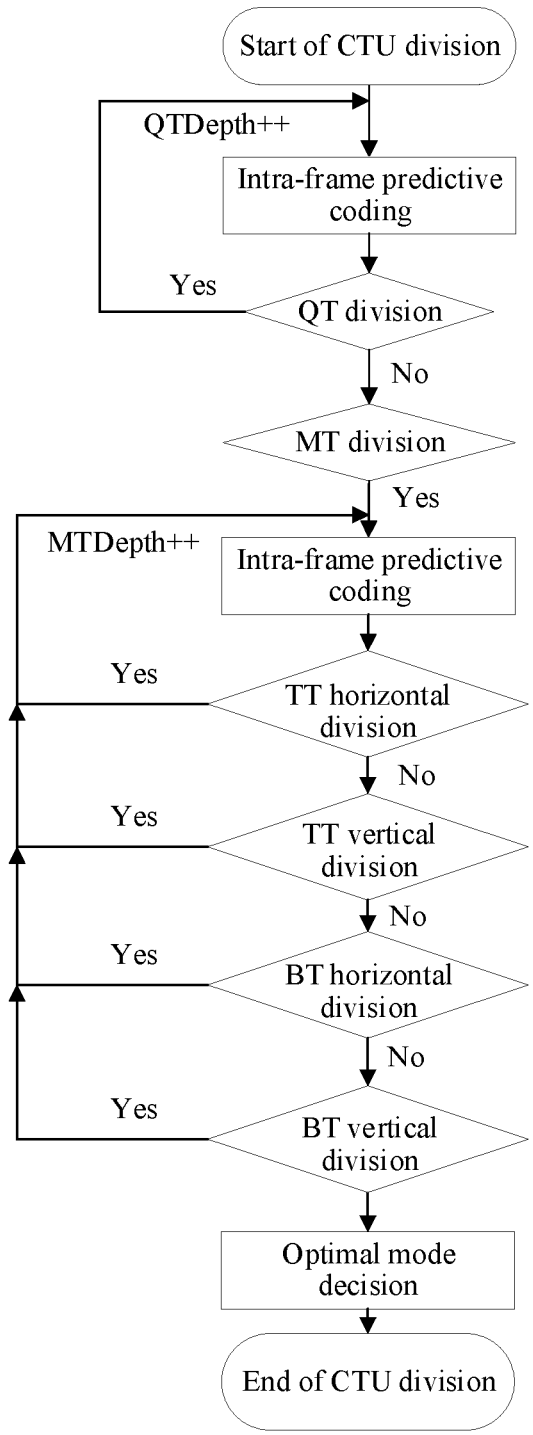
FIG. 9 is a flowchart of dividing a target coding unit according to some embodiments.

In some embodiments, a division manner of a coding unit may be set as required. For example, it may be set that QT division is performed on all coding units, or a plurality of division manners may be set. For example, in a video standard versatile video coding, division on coding units is performed by using more complex and diversified BT division, TT division, and QT division, to achieve a smaller coding data amount. A maximum size of a coding block (that is, a coding unit) may be 128×128 pixels, and a minimum size may be 4×4 pixels. QT division may be first performed on the coding block, and BT division and TT division are than performed on leaf nodes of the QT division, and a minimum value of the leaf node of a QT is 16×16 pixels. As shown in FIG. 9, determination of the procedure shown in the figure may be performed on CU blocks in each CTU, a recursive process of QT division may be first performed, and vertical division and horizontal division, BT division, and TT division are then sequentially traversed through leaf nodes divided by a QT until an optimal division result of all CU blocks in a current CTU is found. Therefore, in processes of QT division, TT division, and BT division, the method provided in the embodiments of this application may be used, to quickly determine a division decision result. If the method provided in the embodiments of this application is used, but whether there is a need to perform division cannot be determined, another division depth decision method may be used to determine a division depth. Multiple-type tree (MT) represents multi-tree division such as division using a QT, a BT, or a TT. MTdepth represents a depth of MT division, QTdepth represents a depth of QT division, and each time division is performed, the depth is increased by 1.

In some embodiments, step S304 of obtaining target pixel gradient data through calculation according to a pixel value of a pixel in the current coding unit includes: dividing the current coding unit to obtain a plurality of coding subunits; calculating a pixel gradient corresponding to each coding subunit to obtain the target pixel gradient data, the pixel gradient of each coding subunit being obtained according to a difference between a pixel value of a pixel corresponding to each coding subunit and the reference pixel value.

Specifically, the division manner may be set as required. For example, the current coding unit may be divided into 4 coding subunits or may be divided into 3 coding subunits. For example, the division manner may be determined according to a division procedure in which the current coding unit is currently located. If a current procedure is to determine whether to perform TT division on the current coding unit, the current coding unit may be divided into 3 coding subunits.

In some embodiments, a divided coding subunit meets a size requirement of a coding unit in a video coding standard or is smaller than the smallest coding unit. For example, if the current coding unit is a non-square block and is divided into 2 coding units, a requirement for a size of a coding unit in a video coding standard is generally not met, and the current coding unit may be divided into a plurality of subblocks according to a size of the smallest coding unit. In an actual example, it is assumed that the current coding unit is 16×8 pixels and the smallest coding unit is 4×4 pixels, the current coding unit may be divided into 8 coding subunits according to the size of 4×4 pixels. A pixel gradient of a coding subunit may include at least one of a global gradient or a local gradient. Pixel gradient data of the coding subunit may be used as the target pixel gradient data.

In some embodiments, the determining a target division decision result corresponding to the current coding unit according to the target pixel gradient data includes: calculating a pixel gradient data difference between the coding subunits, and determining the target division decision result corresponding to the current coding unit according to the pixel gradient data difference between the coding subunits.

Specifically, the pixel gradient data difference may be obtained according to a ratio or a difference value. For example, the pixel gradient data difference may be an absolute value of the difference value or may be a square of the difference value. The terminal device may calculate a pixel gradient data difference between every two coding subunits. Alternatively, at least one of a pixel gradient data difference in a horizontal direction or in a vertical direction is calculated. The pixel gradient data difference in the horizontal direction may be a pixel gradient data difference between a left subblock (coding subunit) and an adjacent right subblock. The pixel gradient data difference in the vertical direction may be a pixel gradient data difference between a top subblock and an adjacent bottom subblock. For example, as shown in FIG. 10, it is assumed that the current coding unit is divided into 4 coding subunits, which are respectively 0, 1, 2, and 3. The pixel gradient data difference in the horizontal direction may include at least one of a pixel gradient data difference between the coding subunit 0 and the coding subunit 1 or a pixel gradient data difference between the coding subunit 2 and the coding subunit 3. The pixel gradient data difference in the vertical direction may include at least one of a pixel gradient data difference between the coding subunit 0 and the coding subunit 2 or a pixel gradient data difference between the coding subunit 1 and the coding subunit 3.

The pixel gradient data difference between coding subunits may be represented by using a difference value or a ratio. For example, if it is assumed that a pixel gradient of the coding subunit 1 is x and a pixel gradient of the coding subunit 3 is y, the pixel gradient data difference may be x divided by y or y divided by x.

In some embodiments, when the pixel gradient data difference between the coding subunits meets a third threshold determination condition, the target division decision result corresponding to the current coding unit may be determined as division, and the third threshold determination condition includes a quantity of pixel gradient data differences greater than a corresponding third threshold meeting a third quantity.

Specifically, the meeting a third quantity refers to being greater than or equal to the third quantity. The third threshold may be set as required, and for example, may be obtained according to experience or experiments. For example, target pixel gradient data differences respectively corresponding to division and stop division in video frames of different content may be counted, and a pixel data difference value that causes an accurate rate of the division decision result being division to meet a preset accurate rate such as 98% is selected as the third threshold. The third threshold may alternatively be adaptively adjusted according to a width and a width of a coding block and a ratio of the length to the width. For example, when target pixel gradient data differences respectively corresponding to division and stop division in video frames of different content are counted, counting may be performed by distinguishing different coding block sizes, to obtain thresholds corresponding to coding units of different sizes.

The third quantity may be set as required. For example, the third quantity may be a quantity corresponding to all the pixel gradient data differences, or may be a quantity corresponding to a part of the pixel gradient data differences provided that the target division decision result corresponding to the current coding unit is division when one pixel gradient data difference is greater than the third threshold. When the pixel gradient data difference between the coding subunits is relatively large, it indicates that a difference between content of the coding subunits is relatively large, and corresponding reference blocks need to be obtained respectively for prediction to obtain predicted values of the coding subunits, to obtain a smaller prediction residual. Therefore, the division decision result may be division, to reduce a data amount of coded data obtained through coding.

In some embodiments, the determining a target division decision result corresponding to the current coding unit according to the target pixel gradient data includes: obtaining a target quantity of coding subunits of which pixel gradient data is greater than a fourth threshold, and determining the target division decision result corresponding to the current coding unit as division when the target quantity exceeds a fourth quantity or a ratio of the target quantity to a quantity of the coding subunits exceeds a first ratio.

Specifically, the first ratio may be set as required, and for example, may be one quarter. The fourth quantity may be set as required, and for example, may be 5. When the target quantity exceeds the fourth quantity or the ratio of the target quantity to the quantity of the coding subunits exceeds the first ratio, it indicates that in the coding subunits, image content changes rapidly. Therefore, there is a need to divide the current coding unit to perform coding by using a coding subunit as a unit, or divide the coding subunits again to reduce a prediction residual.

The step of determining the target division decision result provided in the embodiments of this application may be applicable before a step of determining a division depth of a coding unit by using a rate-distortion cost. For example, when a coding unit is determined by using a division solution using a structure in which a plurality of trees (for example, a QT, a TT, and a BT) are mixed, although the coding efficiency may be improved, a huge increase in the coding time is also brought, which is quite unfavorable for acceleration of an encoder. Especially, when increasingly more modes are traversed, for each mode, an intra-frame prediction process in this mode needs to be performed, and intra-frame prediction includes 67 intra-frame direction predictions and a large quantity of intra-frame prediction technologies, and a large quantity of decisions related to rate distortion optimization may greatly increase the calculation complexity of an encoder. By combining structure features of the BT, the TT, and the QT and content information of a coding block, whether a current CU block needs to be divided or not divided may be determined through advance decision, thereby effectively reducing tentative traversing of various division structures in a CU block, so that the coding time is greatly reduced and the compression efficiency of a video standard is improved.

In some embodiments, different decision methods may be provided for a square block (that is, the current coding unit is square) or a non-square block. For example, the following pseudo-code shows a first decision method for a square block. Thr_G represents a threshold corresponding to a global gradient, and Thr_L represents a threshold corresponding to a local gradient. "&&" represents an "and" symbol, and "||" represents an "or" symbol. For example, a and b may be set according to experience or experiments, the two values may be alternatively obtained through counting, and a value a and a value b corresponding to stop division when a division decision is made by using a rate-distortion cost are counted, to obtain a value that causes an accurate rate of the decision of stop division to be higher than a preset accurate rate. The values of a and b may be alternatively adaptively adjusted according to a size of the current coding unit. For example, a and b may be respectively 1.414 and 1.2.

getRatioFlag represents calculating a ratio. GlobalGradientSubBlock_Ver[H] represents a global gradient difference of a coding subunit H. For example, GlobalGradientSubBlock_Ver[1] represents a global gradient difference of a coding subunit 1. As can be seen from the following code, when all local gradients are less than a corresponding first threshold, and all global gradient differences are smaller than a corresponding first threshold, it is determined that the target division decision result is not to perform division. If the result cannot be certainly determined as stop division, the current coding unit may be divided into 4 subblocks, to calculate a global pixel gradient data difference in the horizontal direction and a global pixel gradient data difference in the vertical direction. If a ratio of a global pixel gradient data difference between subblocks is greater than b, division is certainly performed.

If (GlobalGradient_Hor<Thr_G && LocalGradient_Hor<THr_L && GlobalGradient_Ver<Thr_G && LocalGradient_Ver<THr_L) // if a global gradient difference in the horizontal direction and a global gradient difference in the vertical direction are all less than a threshold corresponding to a global gradient and a local gradient in the horizontal direction and a local gradient in the vertical direction are all less than a threshold corresponding to a local gradient {
    If (GlobalGradient_45<a*Thr_G && LocalGradient_45<a*THr_L && GlobalGradient_135<a*Thr_G && LocalGradient_135<a*THr_L) // if a global gradient difference in the 45-degree direction and a global gradient difference in the 135-degree direction are all less than a times of the threshold corresponding to the global gradient, and a local gradient in the 45-degree direction and a local gradient in the 135-degree direction are all less than b times of the threshold corresponding to the local gradient {
    NotSplit=1; // division is certainly not performed, namely, a division decision result is stop division.
    }
} else // otherwise, the following operation is performed
{
    Int HorFalg=getRatioFlag (GlobalGradientSubBlock_Hor[0], GlobalGradientSubBlock_Hor[1]) || getRatioFlag (GlobalGradientSubBlock_Hor[2], GlobalGradientSubBlock_Hor[3]); // calculating a ratio of a global pixel horizontal gradient difference of a coding subunit 0 to that of a coding subunit 1, or a ratio of a global pixel horizontal gradient difference of a coding subunit 2 to that of a coding subunit 3, namely, calculating a ratio of global pixel gradient data differences in the horizontal direction.
    Int VerFlag=getRatioFlag (GlobalGradientSubBlock_Ver[0], GlobalGradientSubBlock_Ver[2])||getRatioFlag (GlobalGradientSubBlock_Ver[1], GlobalGradientSubBlock_Ver[3]); // calculating a ratio of a global pixel vertical gradient difference of the coding subunit 0 to that of the coding subunit 2, or a ratio of a global pixel vertical gradient difference of the coding subunit 1 to that of the coding subunit 3, namely, calculating a ratio of global pixel gradient data differences in the vertical direction.
    If (HorFalg && VerFlag) {
    DoSplit=1; // if the ratio of the global pixel gradient data differences in the vertical direction and the ratio of the global pixel gradient data differences in the horizontal direction are all greater than b, the division decision result is performing division
    }
}
}
Bool getRatioFlag (double x, double y) {
    If (x==0||y==0) return true;
    If (x/y>b||y/x>return true; // if x divided by y or y divided by x is greater than b, return true.
    Else return false; // otherwise, return false.
}

In some embodiments, the following pseudo-code shows a second decision method for a square block. When BT division and TT division are performed, the second decision method may be used, to soften a decision condition. Thr_G_Limit refers to a gradient threshold corresponding to a global gradient, and may be the same as or may be different from Thr_G. Thr_L_Limit refers to a gradient threshold corresponding to a local gradient, and may be the same as or may be different from Thr_L.

If (min {GlobalGradient_Hor, GlobalGradient_Ver, GlobalGradient_45, GlobalGradient_135}>Thr_G_Limit||min {LocalGradient_Hor, LocalGradient_Ver, LocalGradient_45, LocalGradient_135}>Thr_L_Limit) {
    DoSplit=1; // if a minimum value in the global pixel gradient differences respectively corresponding to the horizontal direction, the vertical direction, the 45-degree direction, and the 135-degree direction is greater than the gradient threshold corresponding to the global pixel gradient, and a minimum value in the local pixel gradients respectively corresponding to the horizontal direction, the vertical direction, the 45-degree direction, and the 135-degree direction is greater than the gradient threshold corresponding to the local pixel gradient, the division decision result is performing division In some embodiments, the following pseudo-code shows a first decision method for a non-square block. GlobalGradient_Hor_Left, GlobalGradient_Hor_Right, GlobalGradient_Ver_Above, GlobalGradient_Ver_Below respectively refers to a global gradient difference corresponding to a left half part, a global gradient difference corresponding to a right half part, a global gradient difference corresponding to a top half part, and a global gradient difference corresponding to a bottom half part. a_hor may be a preset value and may be determined with reference to the method for obtaining the preset value a.

If (Width/Height>2) // when a ratio of the width to the height is greater than 2 {
    If (GlobalGradient_Hor_Left>a_hor*GlobalGradient_Hor_Right||GlobalGradient_Hor_Right>a_hor*GlobalGradient_Hor_Left) {
    DoSplit=1; // if the global gradient difference corresponding to the left half part is a_hor times of the global gradient difference corresponding to the right half part, or the global gradient difference corresponding to the right half part is a_hor times of the global gradient difference corresponding to the left half part, the division decision result is performing division.
```
}
}
```
If (Height/Width>2) // when a ratio of the height to the width is greater than 2 {
    If (GlobalGradient_Ver_Above>a_hor*GlobalGradient_Ver_Below||GlobalGradient_Ver_Below >a_hor*GlobalGradient_Ver_Above) {
    DoSplit=1; // if the global gradient difference corresponding to the top half part is a_hor times of the global gradient difference corresponding to the bottom half part, or the global gradient difference corresponding to the bottom half part is a_hor times of the global gradient difference corresponding to the top half part, the division decision result is performing division.
```
}
}
```

In some embodiments, the following pseudo-code shows a second decision method for a non-square block. Decision may be made by using the second decision method for a non-square block when it cannot be determined whether to divide by using the first decision method for a non-square block, to perform a more elaborate operation. The target coding unit may be divided by using a smallest coding unit such as 4×4 pixels, to perform calculation of a local gradient on each coding subunit, and a calculation manner of the local gradient is to calculate a difference value pixel by pixel. subBlkNum refers to a quantity of coding subunits. Thr_Sub_Limit represents a gradient threshold, namely, a gradient value that can traverse each subblock in the current coding unit, and a quantity of subblocks greater than Thr_Sub_Limit is counted, and if gradients of ¼ subblocks are greater than Thr_Sub_Limit, the division decision result of the block is performing division.
```
Int count=0;
For (int I=0; I<subBlkNum; i++) {
If (Gradient_subBlk[i]>Thr_Sub_Limit) count++;
If (count>¼*subBlkNum) {
DoSplit=1;
Break;
}
}
```
The video coding method provided in this application is described below by using a specific embodiment:

1. A video image is received from a video sequence, and the video image is split into one or more coding units of a preset size as a target coding unit.

2. The target coding unit is divided into a plurality of regions, pixel gradients corresponding to the regions are calculated, and a global pixel gradient difference between the regions is calculated.

For example, horizontal division, vertical division, and diagonal division may be performed on the current coding unit. Global pixel gradients of the regions are calculated, and gradient differences of global pixel gradients respectively corresponding to the horizontal direction, the vertical direction, the 45-degree direction, and the 135-degree direction are calculated according to formulas (5) to (8).

3. A local pixel gradient of the current coding unit in each direction is calculated.

For example, a gradient calculation direction may include the horizontal direction, the vertical direction, the 45-degree direction, and the 135-degree direction. Local pixel gradients in the horizontal direction, the vertical direction, the 45-degree direction, and the 135-degree direction may be calculated according to formulas (1) to (4).

4. Whether each global pixel gradient difference is less than a corresponding first threshold is determined, whether each local pixel gradient is less than a corresponding first threshold is determined, and if yes, a target division decision result is determined as stop division. If no, step 5 is entered.

5. The target coding unit is divided into 4 coding subunits, a global pixel gradient corresponding to each coding subunit is calculated, and a global pixel gradient data difference corresponding to the vertical direction and a global pixel gradient data difference corresponding to the horizontal direction are calculated.

For example, the pixel gradient data difference in the horizontal direction may include at least one of a pixel gradient data difference between a coding subunit 0 and a coding subunit 1 or a pixel gradient data difference between a coding subunit 2 and a coding subunit 3. The pixel gradient data difference in the vertical direction may include at least one of a pixel gradient data difference between the coding subunit 0 and the coding subunit 2 or a pixel gradient data difference between the coding subunit 1 and the coding subunit 3.

6. When the pixel gradient data difference between the coding subunits meets a third threshold determination condition, the target division decision result corresponding to the current coding unit is determined as division. If the third threshold determination condition is not met, step 7 is entered.

For example, if at least one of a pixel gradient data difference between the coding subunit 0 and the coding subunit 1, a pixel gradient data difference between the coding subunit 2 and the coding subunit 3, a pixel gradient data difference between the coding subunit 0 and the coding subunit 2, a pixel gradient data difference between the coding subunit 1 and the coding subunit 3 is greater than a third threshold, the target division decision result corresponding to the current coding unit is determined as division.

7. A division depth of the current coding unit is determined according to a rate-distortion cost.

For example, a first rate-distortion cost corresponding to coding by using the current coding unit as a complete block and a second rate-distortion cost corresponding to coding by dividing the current coding unit into 4 subblocks may be calculated, and if the first rate-distortion cost is larger, the division decision result is division. If the second rate-distortion cost is larger, the division decision result is stop division.

In some embodiments, the decision of block division (coding unit division) may be both performed on a luminance block and a chroma block by using the method in the embodiments of this application.

As shown in FIG. 11, in some embodiments, a video coding apparatus is provided. The video coding apparatus may be integrated on the foregoing terminal device, and may specifically include a current coding unit obtaining module 1102, a target pixel gradient data obtaining module 1104, a target division decision result determining module 1106, and a video coding module 1108.

The target coding unit obtaining module 1102 is configured to obtain a current coding unit.

The target pixel gradient data obtaining module 1104 is configured to obtain target pixel gradient data through calculation according to a pixel value of a pixel in the current coding unit, the target pixel gradient data being obtained according to a difference between the pixel value of the pixel and a reference pixel value.

The target division decision result determining module 1106 is configured to determine a target division decision result corresponding to the current coding unit according to the target pixel gradient data.

The video coding module 1108 is configured to perform video coding on the current coding unit according to the target division decision result.

In some embodiments, the target pixel gradient data obtaining module 1104 includes:

a reference pixel value obtaining unit, configured to determine a current pixel in the current coding unit, and obtain a pixel value of a target adjacent pixel corresponding to the current pixel as the reference pixel value;

a pixel value difference calculation unit, configured to calculate a difference between a pixel value of the current pixel and the reference pixel value to obtain a pixel value difference corresponding to the current pixel; and a target pixel gradient data obtaining unit, configured to collect statistics on a pixel value difference corresponding to each pixel in the current coding unit, to obtain the target pixel gradient data.

In some embodiments, a unit for determining a target adjacent pixel corresponding to the current pixel is configured to: obtain a target gradient calculation direction; and obtain an adjacent pixel corresponding to the current pixel in the target gradient calculation direction as the target adjacent pixel.

In some embodiments, the target pixel gradient data obtaining module 1104 includes:

a pixel gradient calculation unit, configured to divide the current coding unit into a plurality of regions, and calculate a pixel gradient corresponding to each region, the pixel gradient corresponding to each region being obtained according to a difference between a pixel value of a pixel corresponding to each region and the reference pixel value; and a gradient difference calculation unit, configured to calculate a pixel gradient difference between the regions to obtain the target pixel gradient data.

In some embodiments, the gradient difference calculation unit is configured to subtract a pixel gradient corresponding to a second region from a pixel gradient corresponding to a first region to obtain a pixel gradient difference between the first region and the second region.

In some embodiments, the target division decision result determining module 1106 is configured to determine, when the target pixel gradient data meets a first threshold condition, the target division decision result corresponding to the current coding unit as stop division, the first threshold condition including a quantity of target pixel gradient data less than a corresponding first threshold being greater than or equal to a first quantity.

In some embodiments, the target division decision result determining module 1106 is configured to determine, when the target pixel gradient data meets a second threshold condition, the target division decision result corresponding to the current coding unit as division, the second threshold condition including a quantity of target pixel gradient data greater than a corresponding second threshold being greater than or equal to a second quantity.

In some embodiments, the target pixel gradient data obtaining module 1104 includes:

a division unit, configured to divide the current coding unit to obtain a plurality of coding subunits; and a coding subunit gradient data calculation unit, configured to calculate pixel gradient data corresponding to each coding subunit to obtain the target pixel gradient data, a pixel gradient corresponding to each coding subunit being obtained according to a difference between a pixel value of a pixel corresponding to each coding subunit and the reference pixel value.

In some embodiments, the target division decision result determining module 1106 is configured to calculate a pixel gradient data difference between the coding subunits, and determine the target division decision result corresponding to the current coding unit according to the pixel gradient data difference between the coding subunits.

In some embodiments, the target division decision result determining module 1106 is configured to determine, when the pixel gradient data difference between the coding subunits meets a third threshold determination condition, the target division decision result corresponding to the current coding unit as division, the third threshold determination condition including a quantity of pixel gradient data differences greater than a corresponding third threshold being greater than or equal to a third quantity.

In some embodiments, the target division decision result determining module 1106 is configured to obtain a target quantity of coding subunits of which pixel gradient data is greater than a fourth threshold, and determine the target division decision result corresponding to the current coding unit as division when the target quantity exceeds a fourth quantity or a ratio of the target quantity to a quantity of the coding subunits exceeds a first ratio.

In some embodiments, the video coding module 1108 is configured to: when the target division decision result is stop division, perform video coding by using the current coding unit as a coding unit; and when the target division decision result is division, divide the current coding unit to obtain a plurality of coding subunits, and perform video coding according to the coding subunits. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 12:
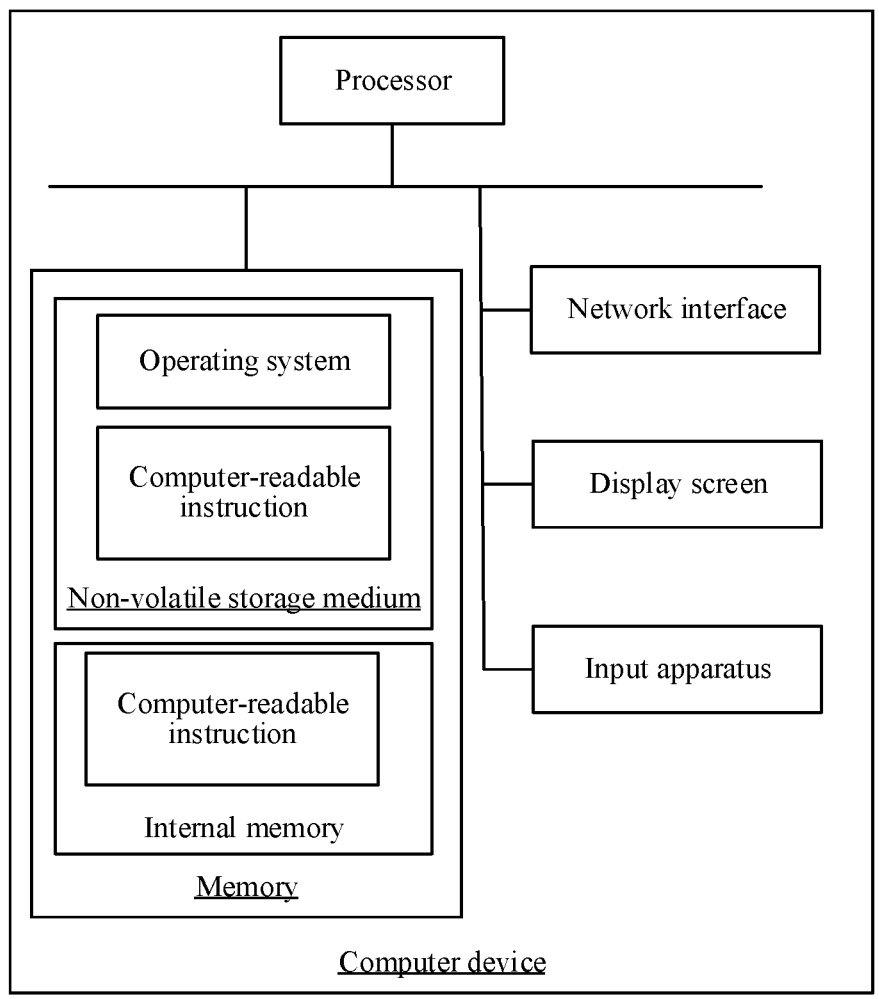
FIG. 12 is a block diagram of an internal structure of a computer device according to some embodiments.

FIG. 12 is a diagram of an internal structure of a computer device according to some embodiments. The computer device may be specifically the terminal device in FIG. 1. As shown in FIG. 12, the computer device includes a processor, a memory, a network interface, an input apparatus, and a display screen that are connected through a system bus. The memory includes a non-volatile storage medium and an internal memory. The non-volatile storage medium of the computer device stores an operating system, and may further store computer-readable instructions. The computer-readable instructions, when executed by the processor, may cause the processor to implement a video coding method. The internal memory may also store the computer-readable instructions. The computer-readable instructions, when executed by the processor, may cause the processor to implement the video coding method. The display screen of the computer device may be a liquid crystal display screen or an e-ink display screen. The input apparatus of the computer device may be a touch layer covering the display screen, or a button, a trackball, or a touchpad disposed on a housing of the computer device, or an external keyboard, touchpad, mouse, or the like.

A person skilled in the art may understand that, the structure shown in FIG. 12 is only a block diagram of a part of a structure related to a solution of this application and does not limit the computer device to which the solution of this application is applied. Specifically, the computer device may include more or fewer components than those in the drawings, or some components are combined, or a different component deployment is used.

In some embodiments, the video coding apparatus provided in this application may be implemented in a form of computer-readable instructions, and the computer-readable instructions may run on the computer device shown in FIG. 12. The computer device may be a terminal or a server, and the memory of the computer device may store various program modules forming the video coding apparatus, such as the current coding unit obtaining module 1102, the target pixel gradient data obtaining module 1104, the target division decision result determining module 1106, and the video coding module 1108 shown in FIG. 11. The computer-readable instructions formed by the various program modules cause the processor to perform the steps of the video coding method described in the embodiments of this application in this specification.

For example, the computer device shown in FIG. 12 may obtain a current coding unit by using the current coding unit obtaining module 1102 in the video coding apparatus shown in FIG. 11; obtain target pixel gradient data through calculation according to a pixel value of a pixel in the current coding unit by using the target pixel gradient data obtaining module 1104, the target pixel gradient data being obtained according to a difference between the pixel value of the pixel and a reference pixel value; determine a target division decision result corresponding to the current coding unit according to the target pixel gradient data by using the target division decision result determining module 1106; and perform video coding on the current coding unit according to the target division decision result by using the video coding module 1108.

In some embodiments, a computer device is provided, including a memory and a processor, the memory storing computer-readable instructions, the computer-readable instructions, when executed by the processor, causing the processor to perform the steps of the video coding method. The steps of the video coding method herein may be the steps in the video coding method in the foregoing embodiments.

In some embodiments, a computer-readable storage medium is provided, storing computer-readable instructions, the computer-readable instructions, when executed by a processor, causing the processor to perform the steps of the video coding method. The steps of the video coding method herein may be the steps in the video coding method in the foregoing embodiments.

In an embodiment, a computer program product or a computer program is provided. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the steps in the method embodiments.

It is to be understood that although the steps in the flowcharts of the embodiments of this application are displayed in sequence according to arrows, the steps are not necessarily performed in the sequence indicated by the arrows. Unless otherwise explicitly specified in this application, execution of the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages of the another step.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. References to the memory, the storage, the database, or other medium used in the embodiments provided in this application may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a RAM or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchlink (Synchlink) DRAM (SLDRAM), a Rambus (Rambus) direct RAM (RDRAM), a direct Rambus dynamic RAM (DRDRAM), and a Rambus dynamic RAM (RDRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing embodiments show only several implementations of this application and are described in detail, which, however, are not to be construed as a limitation to the patent scope of this application. For a person of ordinary skill in the art, several transformations and improvements can be made without departing from the idea of this application. These transformations and improvements belong to the protection scope of this application. Therefore, the protection scope of the patent of this application shall be subject to the appended claims.

What is claimed is:

1. A video coding method performed by a computer device, the method comprising:
   obtaining a current coding unit;
   obtaining target pixel gradient data through calculation according to a pixel value of a pixel in the current coding unit, the target pixel gradient data including both global gradient data and local gradient data of the current coding unit, the global gradient data being obtained according to a difference between the pixel value of the pixel and an average pixel value of the current coding unit as a reference pixel value, and the local gradient data being obtained according to a difference between the pixel value of the pixel and a pixel value of another pixel adjacent the pixel as the reference pixel value;

determining a target division decision result corresponding to the current coding unit according to both the global gradient data and the local gradient data of the target pixel gradient data; and performing video coding on the current coding unit according to the target division decision result.

2. The method according to claim 1, wherein the obtaining target pixel gradient data through calculation according to a pixel value of a pixel in the current coding unit comprises:

determining a current pixel in the current coding unit, and obtaining a pixel value of a target adjacent pixel corresponding to the current pixel as the reference pixel value;

calculating a difference between a pixel value of the current pixel and the reference pixel value to obtain a pixel value difference corresponding to the current pixel; and collecting statistics on a pixel value difference corresponding to each pixel in the current coding unit, to obtain the local gradient data of the target pixel gradient data.

3. The method according to claim 2, wherein the obtaining a pixel value of a target adjacent pixel corresponding to corresponding to the current pixel comprises:

obtaining a target gradient calculation direction; and obtaining an adjacent pixel corresponding to the current pixel in the target gradient calculation direction as the target adjacent pixel.

4. The method according to claim 1, wherein the obtaining target pixel gradient data through calculation according to a pixel value of a pixel in the current coding unit comprises:

dividing the current coding unit into a plurality of regions, and calculating a pixel gradient corresponding to each region, the pixel gradient corresponding to each region being obtained according to a difference between a pixel value of a pixel corresponding to each region and the average pixel value; and calculating a pixel gradient difference between the regions to obtain the global gradient data of the target pixel gradient data.

5. The method according to claim 4, wherein the calculating a pixel gradient difference between the regions comprises:

subtracting a pixel gradient corresponding to a second region from a pixel gradient corresponding to a first region to obtain a pixel gradient difference between the first region and the second region.

6. The method according to claim 1, wherein the determining a target division decision result corresponding to the current coding unit according to the target pixel gradient data comprises:

determining, when the target pixel gradient data meets a first threshold condition, the target division decision result corresponding to the current coding unit as stop division, the first threshold condition comprising a quantity of both the global gradient data and the local gradient data of the target pixel gradient data less than a corresponding first threshold being greater than or equal to a first quantity.

7. The method according to claim 1, wherein the determining a target division decision result corresponding to the current coding unit according to the target pixel gradient data comprises:

determining, when the target pixel gradient data meets a second threshold condition, the target division decision result corresponding to the current coding unit as division, the second threshold condition comprising a quantity of at least one of the global gradient data and the local gradient data of the target pixel gradient data greater than a corresponding second threshold being greater than or equal to a second quantity.

8. The method according to claim 1, wherein the obtaining target pixel gradient data through calculation according to a pixel value of a pixel in the current coding unit comprises:

dividing the current coding unit to obtain a plurality of coding subunits; and calculating pixel gradient data corresponding to each coding subunit to obtain the target pixel gradient data, a pixel gradient corresponding to each coding subunit being obtained according to a difference between a pixel value of a pixel corresponding to each coding subunit and the reference pixel value.

9. The method according to claim 8, wherein the determining a target division decision result corresponding to the current coding unit according to the target pixel gradient data comprises:

calculating a pixel gradient data difference between the coding subunits, and determining the target division decision result corresponding to the current coding unit according to the pixel gradient data difference between the coding subunits.

10. The method according to claim 9, wherein the determining the target division decision result corresponding to the current coding unit according to the pixel gradient data difference between the coding subunits comprises:

determining, when the pixel gradient data difference between the coding subunits meets a third threshold determination condition, the target division decision result corresponding to the current coding unit as division, the third threshold determination condition comprising a quantity of pixel gradient data differences greater than a corresponding third threshold being greater than or equal to a third quantity.

11. The method according to claim 8, wherein the determining a target division decision result corresponding to the current coding unit according to the target pixel gradient data comprises:

obtaining a target quantity of coding subunits of which pixel gradient data is greater than a fourth threshold, and determining the target division decision result corresponding to the current coding unit as division when the target quantity exceeds a fourth quantity or a ratio of the target quantity to a quantity of the coding subunits exceeds a first ratio.

12. The method according to claim 1, wherein the performing video coding on the current coding unit according to the target division decision result comprises:

when the target division decision result is stop division, performing video coding by using the current coding unit as a coding unit; and when the target division decision result is division, dividing the current coding unit to obtain a plurality of coding subunits, and performing video coding according to the coding subunits.

13. A computer device, comprising a memory and a processor, the memory storing computer-readable instructions, the computer-readable instructions, when executed by the processor, causing the computer device to perform a plurality of operations including:
- obtaining a current coding unit;
- obtaining target pixel gradient data through calculation according to a pixel value of a pixel in the current coding unit, the target pixel gradient data including both global gradient data and local gradient data of the current coding unit, the global gradient data being obtained according to a difference between the pixel value of the pixel and an average pixel value of the current coding unit as a reference pixel value, and the local gradient data being obtained according to a difference between the pixel value of the pixel and a pixel value of another pixel adjacent the pixel as the reference pixel value;
- determining a target division decision result corresponding to the current coding unit according to both the global gradient data and the local gradient data of the target pixel gradient data; and
- performing video coding on the current coding unit according to the target division decision result.

14. The computer device according to claim 13, wherein the obtaining target pixel gradient data through calculation according to a pixel value of a pixel in the current coding unit comprises:
- determining a current pixel in the current coding unit, and obtaining a pixel value of a target adjacent pixel corresponding to the current pixel as the reference pixel value;
- calculating a difference between a pixel value of the current pixel and the reference pixel value to obtain a pixel value difference corresponding to the current pixel; and
- collecting statistics on a pixel value difference corresponding to each pixel in the current coding unit, to obtain the local gradient data of the target pixel gradient data.

15. The computer device according to claim 13, wherein the obtaining target pixel gradient data through calculation according to a pixel value of a pixel in the current coding unit comprises:
- dividing the current coding unit into a plurality of regions, and calculating a pixel gradient corresponding to each region, the pixel gradient corresponding to each region being obtained according to a difference between a pixel value of a pixel corresponding to each region and the average pixel value; and
- calculating a pixel gradient difference between the regions to obtain the global gradient data of the target pixel gradient data.

16. The computer device according to claim 13, wherein the obtaining target pixel gradient data through calculation according to a pixel value of a pixel in the current coding unit comprises:
- dividing the current coding unit to obtain a plurality of coding subunits; and
- calculating pixel gradient data corresponding to each coding subunit to obtain the target pixel gradient data, a pixel gradient corresponding to each coding subunit being obtained according to a difference between a pixel value of a pixel corresponding to each coding subunit and the reference pixel value.

17. The computer device according to claim 13, wherein the performing video coding on the current coding unit according to the target division decision result comprises:
- when the target division decision result is stop division, performing video coding by using the current coding unit as a coding unit; and
- when the target division decision result is division, dividing the current coding unit to obtain a plurality of coding subunits, and performing video coding according to the coding subunits.

18. One or more non-transitory storage media storing computer-readable instructions, the computer-readable instructions, when executed by one or more processors of a computer device, causing the computer device to perform a plurality of operations including:
- obtaining a current coding unit;
- obtaining target pixel gradient data through calculation according to a pixel value of a pixel in the current coding unit, the target pixel gradient data including both global gradient data and local gradient data of the current coding unit, the global gradient data being obtained according to a difference between the pixel value of the pixel and an average pixel value of the current coding unit as a reference pixel value, and the local gradient data being obtained according to a difference between the pixel value of the pixel and a pixel value of another pixel adjacent the pixel as the reference pixel value;
- determining a target division decision result corresponding to the current coding unit according to both the global gradient data and the local gradient data of the target pixel gradient data; and
- performing video coding on the current coding unit according to the target division decision result.

19. The non-transitory storage media according to claim 18, wherein the obtaining target pixel gradient data through calculation according to a pixel value of a pixel in the current coding unit comprises:
- determining a current pixel in the current coding unit, and obtaining a pixel value of a target adjacent pixel corresponding to the current pixel as the reference pixel value;
- calculating a difference between a pixel value of the current pixel and the reference pixel value to obtain a pixel value difference corresponding to the current pixel; and
- collecting statistics on a pixel value difference corresponding to each pixel in the current coding unit, to obtain the local gradient data of the target pixel gradient data.

20. The non-transitory storage media according to claim 18, wherein the performing video coding on the current coding unit according to the target division decision result comprises:
- when the target division decision result is stop division, performing video coding by using the current coding unit as a coding unit; and
- when the target division decision result is division, dividing the current coding unit to obtain a plurality of coding subunits, and performing video coding according to the coding subunits.

* * * * *